May 26, 1925.  1,539,188
H. R. HOFFMAN
AUTOMATIC TRANSMISSION FOR MOTOR VEHICLES
Filed Feb. 17, 1923    3 Sheets-Sheet 1
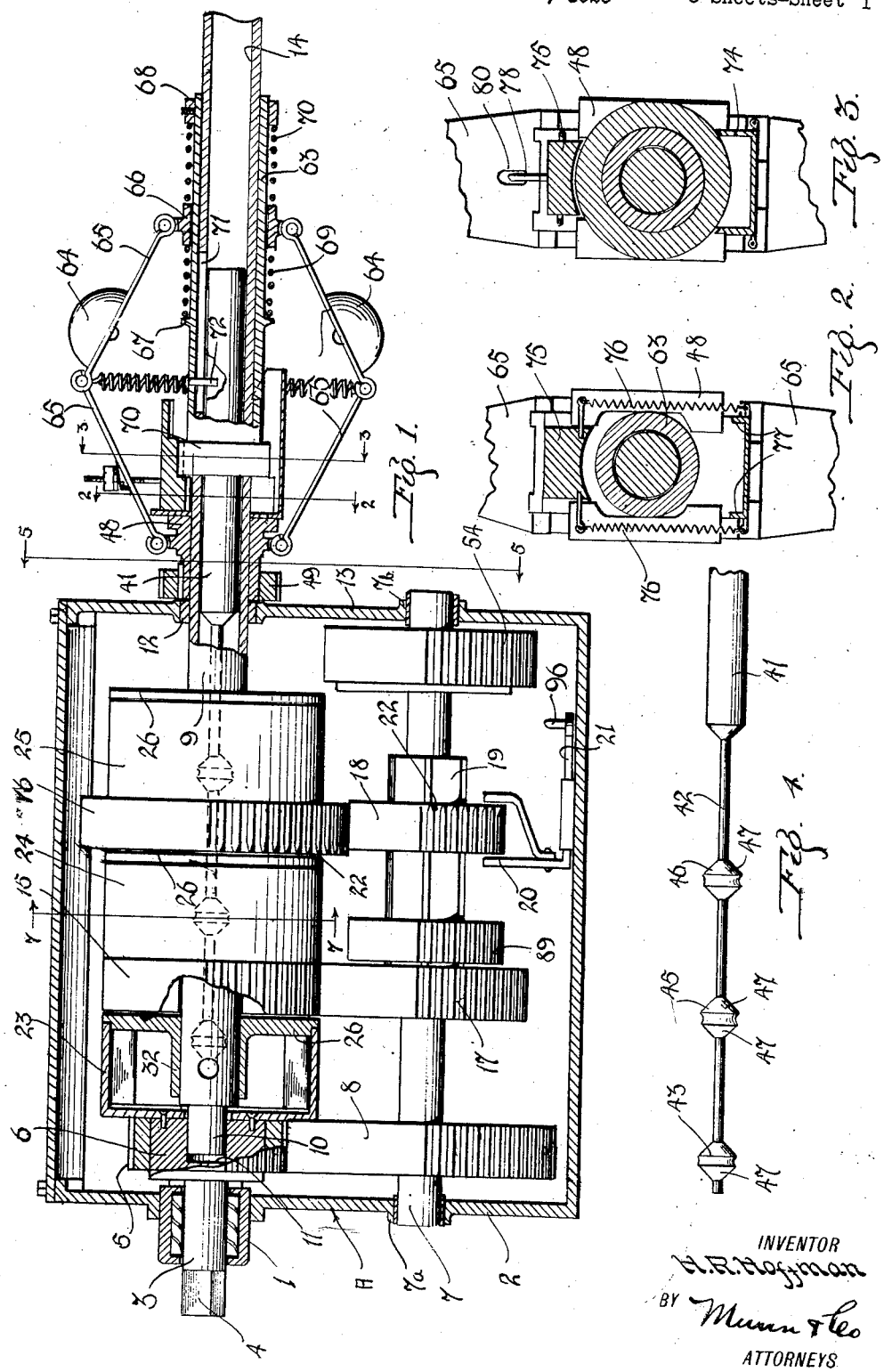
INVENTOR
H. R. Hoffman
BY
Munn & Co
ATTORNEYS

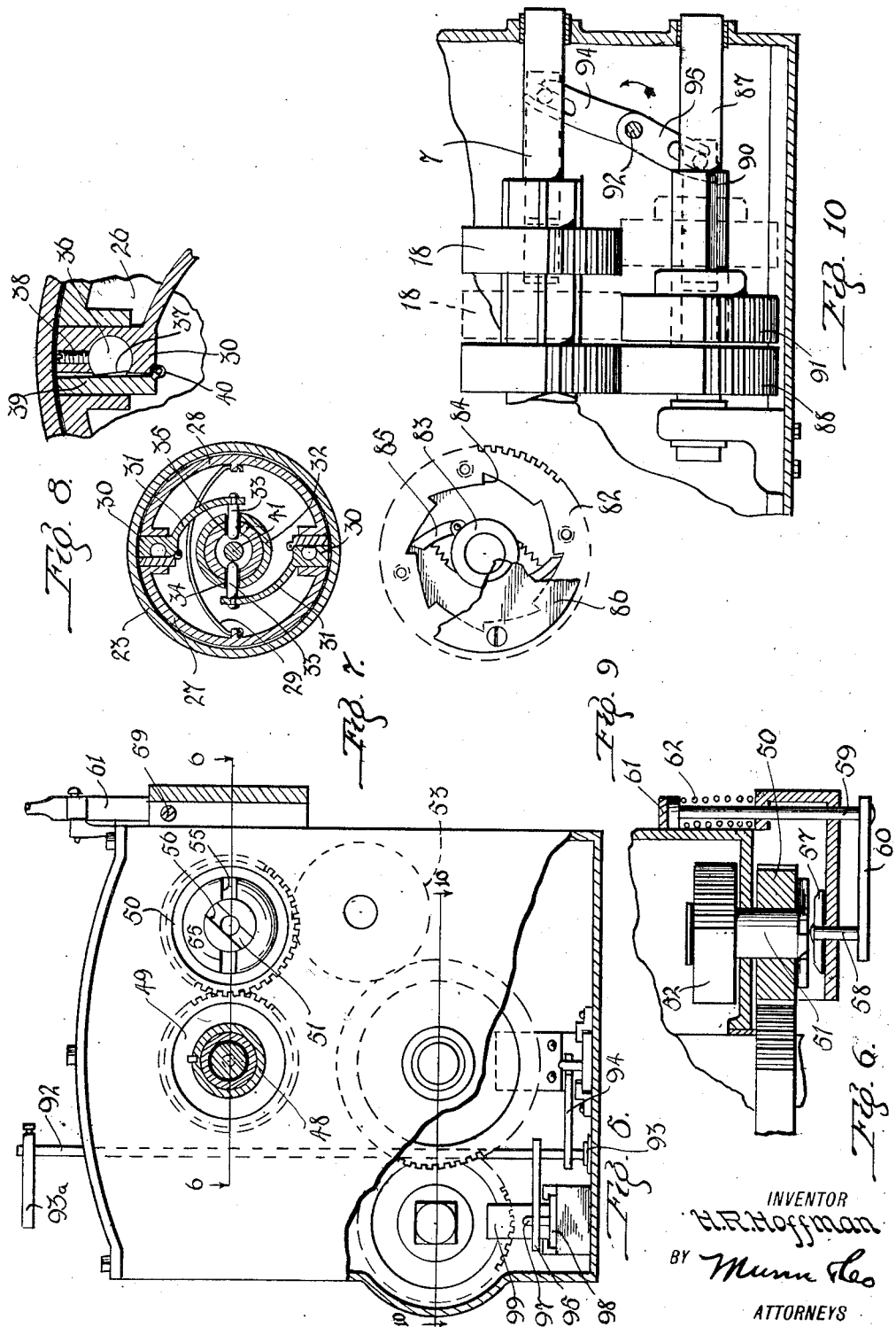

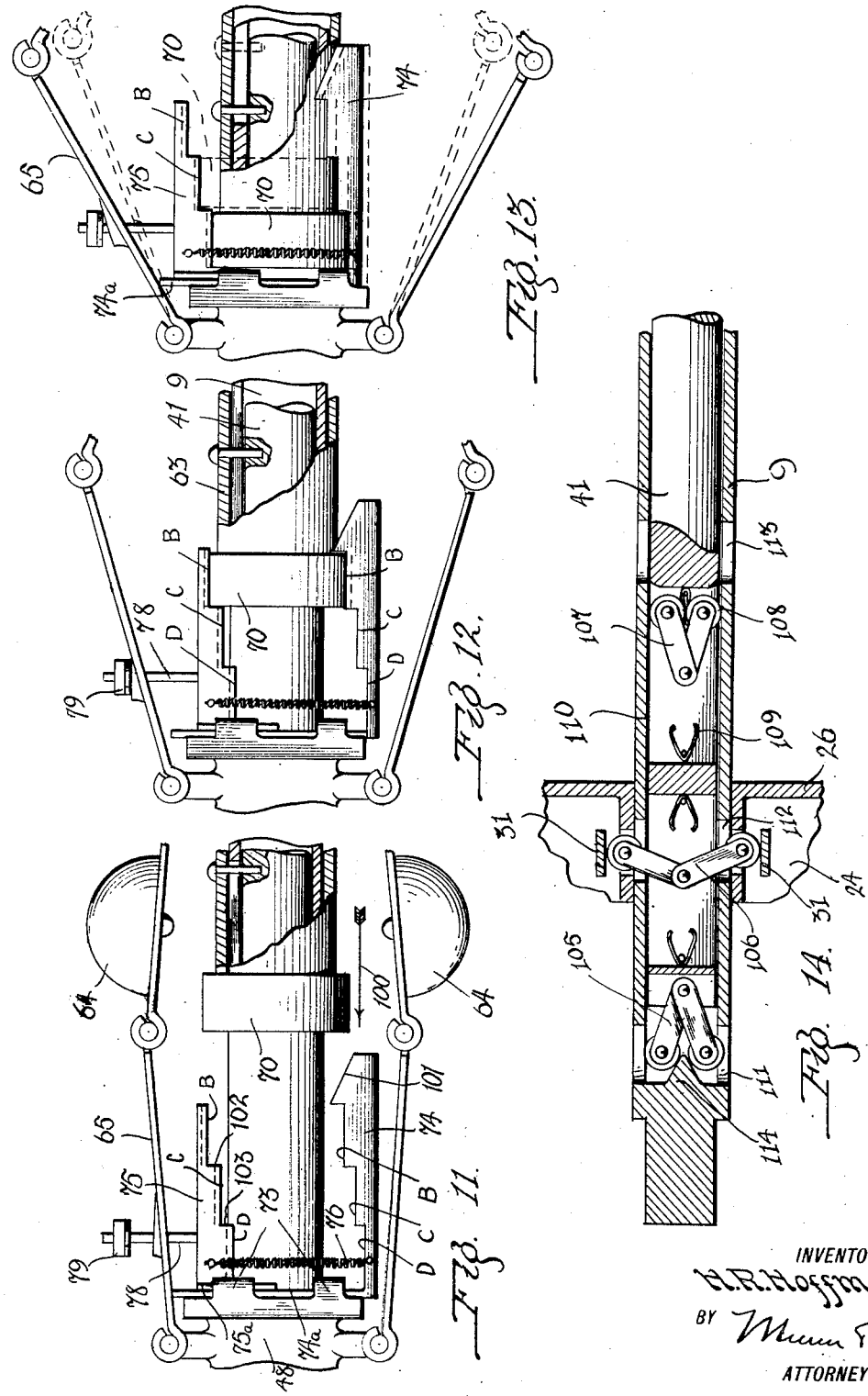

Patented May 26, 1925.

1,539,188

UNITED STATES PATENT OFFICE.

HENRY R. HOFFMAN, OF CHICAGO, ILLINOIS.

AUTOMATIC TRANSMISSION FOR MOTOR VEHICLES.

Application filed February 17, 1923. Serial No. 619,689.

*To all whom it may concern:*

Be it known that I, HENRY R. HOFFMAN, a citizen of the United States, and a resident of Chicago, in the county of Cook and State of Illinois, have invented a new and useful Improvement in Automatic Transmissions for Motor Vehicles, of which the following is a full, clear, and exact description.

My invention relates to improvements in automatic transmission for motor vehicles, and more particularly to that type of automatic transmission in which the engagements of the forward speed gears are effected automatically, thus obviating the necessity of manually engaging the first speed gears as in the case of the ordinary automatic transmission, and it consists in the combinations, constructions, and arrangements herein described and claimed.

My present invention is an improvement over the automatic transmission for motor vehicles disclosed in my co-pending application for patent, Serial No. 560,597, in which I employ certain of the mechanism employed in my present device. My present invention is also an improvement over my automatic gear shift and speed control, disclosed in my co-pending application, Serial No. 514,666, in which I also disclose certain elements employed in the present and latest embodiment of my invention.

An object of my present invention is to provide a mechanism of the character described by means of which the progressive operative engagement of the gears to occasion the change in speed of the differential shaft relative to the engine shaft, is brought about by merely pressing the accelerator, thereby increasing the speed of the engine shafts. In my present invention, it is not necessary to manually actuate the device in order that the operative engagement of the first speed gears may be effected.

A further object of my invention is to provide a novel and effective means for instantaneously and simultaneously engaging and disengaging certain of the clutches employed, thereby effecting an instantaneous operative engagement of the speed gears.

A further object of my invention is to provide a device of the character described in which the engine shaft and the differential shaft are in direct alinement with one another, thereby providing ample room for the operation of a governor concentric the differential shaft. It is well known in the ordinary motor vehicle construction that there is a relatively small space between the differential shaft and the frame of the car which would not permit the successful operation of a centrifugal governor therein.

A further object of my invention is to provide a device of the character described in which a novel and efficient means for reversing the direction of rotation of the differential shaft is effected.

A further object of my invention is to provide a device of the character described that is durable in construction, efficient in operation, and thoroughly practical for the purpose intended.

Other objects and advantages will appear in the following specification, and the novel features of the invention will be particularly pointed out in the appended claims.

My invention is illustrated in the accompanying drawings forming part of this application, in which—

Figure 1 is a sectional view of an embodiment of my invention,

Figure 2 is a sectional view along the line 2—2 of Figure 1,

Figure 3 is a sectional view along the line 3—3 of Figure 1,

Figure 4 is a fragmentary view of a portion of the mechanism shown in Figure 1, a part thereof being broken away, Figure 5 is a sectional view along the line 5—5 of Figure 1, with a portion of the gear housing cut away, Figure 6 is a sectional view along the line 6—6 of Figure 5, Figure 7 is a sectional view along the line 7—7 of Figure 1, Figure 8 is an enlarged sectional view of a portion of the mechanism illustrated in Figure 7, Figure 9 is an end elevation of a portion of the mechanism shown in Figure 1, Figure 10 is a sectional view along the line 10—10 of Figure 5, Figures 11, 12, and 13 are enlarged fragmentary views of a portion of the mechanism illustrated in Figure 1, a part thereof being shown in section, and Figure 14 is an enlarged sectional view of a modified form of the sliding cam and clutch actuating mechanism.

In carrying out my invention, I make use of a gear housing A that may be secured to the frame of a motor vehicle intermediate the engine and the differential shaft in any suitable manner (not shown). A roller bearing 1 is supported upon the wall 2 of the housing, and a stub shaft 3 is rotatably supported in the bearing 1. The end 4 of the stub shaft is arranged for direct connection with the engine shaft of the motor vehicle (not shown). A gear 5 is carried at the opposite end of the shaft 3 concentric a supporting core 6.

A counter shaft 7 is rotatably mounted in bearings 7ª and 7ᵇ in the housing, and a relatively large gear 8 at one end of the counter shaft 7 is in mesh with the gear 5 on the stub shaft 3. It will be observed that the counter shaft 7 turns at all times with the stub shaft 3, which I shall hereinafter refer to as the engine shaft, since this shaft is connected directly to the shaft of the engine.

A hollow shaft 9 is rotatably mounted at one end, by means of a reduced portion 10 thereof, in a suitable bore 11 in the core 6, and rotatably supported intermediate its length in a bearing 12 on the opposite side 13 of the housing A. This hollow shaft 9 extends beyond the housing and is connected adjacent its outer end 14 directly to the differential. I shall therefore refer to this shaft 9 as the differential shaft, since it is at all times connected directly to the differential mechanism of the motor vehicle (not shown).

A second or intermediate speed gear 15 is rotatably mounted on the shaft 9 and is spaced apart from the gear 5. A third or low speed gear 16 is also rotatably mounted on the shaft 9 at a spaced distance from the gear 15.

A gear 17 is carried by the shaft 7 and is at all times in mesh with the gear 15. A smaller gear 18 is feathered upon an enlarged portion 19 of the shaft 7 and may be moved into or out of engagement with the gear 16 at will by means of fingers 20 which engage the opposite side of the gear 18, and a slide 21 upon which the fingers 20 are carried. Movement of the slide 21 in a manner hereinafter described will cause the gear 18 to move into or out of engagement with the gear 16. It will be noted that the edges 22 of the teeth on the gears 10 and 18, respectively, are tapered somewhat to facilitate the engagement and disengagement of these gears.

A clutch drum 23 is supported upon the core 6 and lies concentric with the adjacent portion of the shaft 9. Similar drums 24 and 25 are secured to the gears 15 and 16, respectively, and each lie concentric with the adjacent portions of the shaft 9. Each of the drums 23, 24, and 25 are provided with a movable end plate 26 fixed securely to the shaft 9 so as to turn therewith. the end plates 26 being movable relative to their adjacent clutch drums 23 to 25 inclusive.

With reference to Figure 7, an expanding clutch band comprising two semi-circular segments 27 and 28 are provided within the drums 23, 24, and 25, and yieldably pull toward one another by means of a spring 29.

Means for separating the segments 27 and 28 so that they will move into close engagement with the adjacent clutch drum is provided in a pair of pivotally mounted blocks 30 having curved arms 31 extending therefrom to a point immediately adjacent an inwardly extending flange 32 of the end plates 26. The arms 31 are each provided with fingers 33 which extend through openings 34 in the flange 32 and through alined openings 35 in the differential shaft 9. It will be apparent therefore that contact of the cam or other member with the finger 33 within the shaft 9 will cause a rotative movement of the blocks 30, and therefore the subsequent movement apart of the segments 27 and 28 will cause the drum 23 to engage with its adjacent end plate 26 and drive the shaft 9.

The particular construction of the blocks 30 is novel and is shown in Figure 8. This construction consists in a cylindrical pin 36 that is rotatably mounted on the plate 26. One side 37 of the cylindrical pin 36 is flattened. A set screw 38 is disposed in the block 30 so that the pin 36 may be fixed in any position desired relative to the block 30. A leaf 39 is hingedly mounted to the block 30 at 40. Rotation and subsequent setting of the pin 36 by the set screw 38 will therefore occasion a widening or narrowing of the entire block designated at 30. This simple and efficient mechanism affords a positive and effective adjustment of the expanding band comprising the sectors 27 and 28, so that either a slight or great movement of the fingers 33 will effect the engagement or disengagement of the entire clutch.

A sliding cam 41 is disposed within the hollow shaft 9 and has a reduced portion 42 upon which three enlarged members 43, 45, and 46 are formed. The ends 47 of these enlarged portions are tapered and are convergent at their outermost ends with the reduced portions 42. Movement of the sliding cam 41 and the shaft 9 will therefore occasion the selective engagement with these enlarged portions 43 to 46 inclusive with the fingers 33 of certain of the clutch mechanisms heretofore described.

The position of the enlarged portions in the sliding cam 41 is clearly shown in dotted lines in Figure 1, and the construction of the cam is shown in Figure 4.

Having thus far described my invention, it will be apparent that the longitudinal movement of the cam 41 toward the forward end of the shaft 9, that is the end adjacent the engine shaft 3, will cause the selective engagement of the enlarged portions 43, 45, and 46 with the fingers 33 of the clutch mechanism in such a way that the clutch having the drum 25 will first be engaged, second, the clutch having the drum 24, and last, the clutch having the drum 23, and that a movement of the cam member 41 away from the forward end of the shaft 9 will cause the clutches to again engage selectively, but in a reverse order. This may be clearly seen from an inspection of the cam, as shown in dotted lines in Figure 1.

I provide a means for automatically advancing or retarding the sliding cam 41 that is controlled by the speed of the differential shaft or the engine shaft, dependent upon which one is rotating at the greatest number of revolutions per minute. This mechanism is illustrated in Figure 1, and is illustrated in detail in Figures 11 to 13 inclusive. The mechanism comprises a sleeve 48 rotatably mounted upon the shaft 9 adjacent the outer side of the wall 13 of the housing A. A gear 49 is carried upon this sleeve, the gear being in engagement with a gear 50 rotatably mounted upon the wall 13 (see Figure 6). The gear 50 may be engaged with its supporting shaft 51 in a manner hereinafter described.

A gear 52 is carried by the shaft 51 on the interior of the housing. The gear 52 is in mesh with a gear 53 and the gear 53 is in turn in mesh with a gear 54 carried by the shaft 7. It will be seen therefore that there is a direct gear train between the engine shaft 3 and the sleeve 48 which may be broken at only one point, that point being the connection of the gear 50 with its supporting shaft 51. Means for connecting and disconnecting the gear 50 with its supporting shaft 51 is provided in radially extending grooves 55 on the side wall of the gear 50, and like grooves 56 on the end wall of the shaft 51. A key 57, carried by a pin 58, is arranged to be moved into engagement with the grooves 55 and 56 by means of a spring pressed rod 59 upon which an arm 60 is carried for supporting the pin 58. When the push rod 59 is provided as by means of a lever 61 against the action of the spring 62, the key 57 is moved out of engagement with the gear 50 and the shaft 51, as is shown in Figure 6, and the gear train is broken.

Referring again to the means for actuating the cam shaft 41, it will be noticed that a relatively long sleeve 63 is also mounted upon the shaft 9. The sleeve 63 is arranged for longitudinal movement on the shaft. A centrifugal governor mechanism having weights 64, and each side of which is comprised of a pair of hingedly mounted straps 65, is supported at one end upon the sleeve 48 and at the other end upon a sleeve 66, which sleeve is slidably mounted upon the sleeve 63. The sleeve 63 is provided with an outwardly extending flange 67 adjacent the forward end thereof and a collar 68 fixed at the rearward end thereof. Spiral springs 69 and 70 are disposed one on each side of the sleeve 66 so that the sleeve 66 is yieldably held midway between the flange 67 and the collar 68.

The extreme forward end of the sleeve 63 is terminated in an enlarged annular head portion 70 having a substantially straight side wall. A slot 71 is provided in the shaft 9 and a pin 72, carried by the sleeve 63, is projected through the slot 71 and into the cam 41 so that movement of the sleeve 63 will occasion a like movement of the cam 41. With reference to Figures 11 to 13 inclusive, it will be noted that the rearward end of the sleeve 48 is provided with a pair of slideways 73. Each side of the sleeve 48 has these slideways. A pair of locking members 74 and 75 are each provided with slide portions 74$^a$ and 75$^a$, respectively, by means of which these locking portions are slidably supported upon the sleeve 48 in such a manner that they may move toward or away from the shaft 9, the main body portions and the locking members 74 and 75 being disposed substantially parallel with the axis of the shaft 9. A pair of springs 76 (see Figure 2) are provided for yieldably drawing the locking members 74 and 75 toward one another and toward the shaft 9.

The locking member 74 is provided with its two upwardly bent side walls 77 fashioned in a plurality of steps marked B, C, and D. The corresponding steps B, C, and D are fashioned in the adjacent wall of the solid and upper locking member 75.

The slide portion 74$^a$ of the locking member 74 extends above the sleeve 48 so that it may contact with the adjacent arm 65 of the centrifugal governor. The locking member 75 is provided with an upwardly extending stud bolt 78 which is projected through an opening 80 in the arm 65 adjacent thereto, and has an adjustable lock nut 79 thereon on the outer side of the arm 75.

Means for permitting the engine shaft 3 to drive the governor mechanism, is provided in a pair of ratchet mechanisms mounted within the gears 54 and 52. The gears 54 and 52 are identical on the interior thereof and consist of a shell 82 rotatably mounted upon the hub 83, which hub 83 is secured to the shaft upon which the gear is carried. In the case of the gear 52, this shaft is the shaft 51, and in the case of the gear 54, this shaft is the shaft 7 previously referred to as the counter shaft. The inner wall of the partially hollow shell 82 is provided with ratchet teeth 84 and a pair of spring pressed pawls 85 are carried by the hub 83. A plate 86 is employed to cover the hollow portion of the shell 82. It will be apparent that in the gear shown in Figure 9, that only a counter clockwise movement of the shaft, upon which the hub 83 is mounted, will occasion a movement of the shell 82, and hence a movement of the entire gear. These gears are so constructed that, the governor will be turned by the engine shaft. This construction has been particularly well described in my copending application, Serial No. 560,597, for automatic transmission motor vehicles.

Means for reversing the direction of rotation of the differential shaft 9 is provided in an auxiliary shaft 87. This shaft 87 is mounted parallel with the shaft 7 and has a gear 88 carried thereby which gear is in mesh with a gear 89 carried by the enlarged portion 19 of the shaft 7. A portion of the shaft 87 is squared in cross section, as shown at 90, so that a gear 91, similar in size to the gear 18, is feathered upon the square portion 90 and may be moved longitudinally thereon.

A vertical rod 92 is disposed in the housing A and secured at its lowermost end in a bearing 93. The upper end of the rod 92 has a lever 93ª thereon, by means of which the rod may be turned. A pair of claws 94 and 95 are carried adjacent the lower end of the rod 92. The claw 94 is arranged to be moved into engagement with an upwardly extending pin 96 on the slide member 21 (see Figure 5) so that movement of the rod 92 in a clockwise direction will occasion the rearward movement of the slides 21 and therefore the movement of the gear 18 into engagement with the gear 16.

The claw 95 is arranged to engage with a pin 97 carried on a slideway 98, which slideway has arms 99 which engage the gear 91 so that as the rod 92 is moved in a clockwise direction, the claw 95 will engage with the pin 97 to move the gear 91 out of engagement with the gear 16 and to a point adjacent the gear 88, as shown in Figure 10.

A movement of the rod 92 in a counter clockwise direction will cause the claws 94 and 95 to engage with their respective pins 96 and 97, and move the gears 18 and 91 to the position shown in dotted lines in Figure 10. When these gears are in the position shown in the dotted lines, the direction of rotation of the differential shaft 9 will be in the opposite direction from the engine shaft 3, and the vehicle may then move in a reverse direction when any one of the clutch mechanisms are operated by the cam 41 in a manner heretofore described.

From the foregoing description of the various parts of the device, the operation thereof may be readily understood. In starting a motor vehicle with my improved automatic transmission, it is merely necessary to start the engine and to press slowly upon the accelerator to cause the speed of the engine to increase. As the speed of the engine increases, the centrifugal governor will be operated. If for any reason it is desired to race the engine previous to starting the car, the lever 61 will be manually moved. The upper end of this lever is disposed adjacent the driver's seat. In the event that the lever 61 is actuated against the action of the spring 62, the gear train between the engine shaft 3 and the centrifugal governor will be broken as previously described, and therefore the governor will not turn and the engine is free to race without in any way affecting the operation of the transmission.

Let us assume, however, that it is desired to drive the car. In this event, the driver will slowly increase the speed of the engine, the lever 61 being in an inoperative position. As the engine shaft 3 increases in speed, the centrifugal governor will also increase in speed. At this time the differential shaft 9 will remain stationary as will all of the plates 26 which are carried by the shaft 9. The counter shaft 7 will turn, however, and the gears 5, 15, and 16 will also turn. The gear 16 will turn, provided the rod 92 is in its proper position for the forward movement of the car, that is in the position shown in Figures 5 and 10.

As the speed of the engine gradually increases and the centrifugal governor expands by virtue of the weight 64, the spring 69 will be compressed. This is natural, since the expansion of the governor must be accomplished by a proportional contraction of the longitudinal dimension of the governor. As the spring 69 is compressed, the spring will cause a forward movement of the sleeve 63 upon the shaft 9. This movement will be in the direction of the arrow 100 (see Figure 11). Further increase in speed of the engine will finally cause the enlarged head 70 of the sleeve 63 to engage with the slanting end wall 101 of the locking member 74 and the locking member 74 will move against the action of the springs 76 to permit the head 70 to engage with the first steps B of the locking members 74 and 75. A movement of the head 70 at this time can be only as far as the first step B, since it will be stopped against further movement by the vertical end wall members 102 of the first step. It will be noted that this movement of the head 70 carried by the sleeve 63 is a gradual movement and directly proportional to the speed of the engine as it makes ready to drive the vehicle in its first speed.

As the head 70 engages with the first steps B of the locking members 74 and 75, the cam 71, which has moved with the sleeve 63, will be in such a position that the enlarged portion 46 thereof will engage with the finger 33 of the clutch mechanism associated with the gear 16, and the shaft 9 will turn at a relatively slow rate of speed, since the vehicle is now in first or low gear. It will be understood that the differential shaft 9 is driven through the counter shaft 7, at this time the gears in driving the shaft 9 being as follows, 5, 8, 18, 16, and the clutch having the drum 25.

The exact position of the head 70 and the governor controlled, let us assume while the vehicle is in first speed, is shown in Figure 12. The approach to this position is shown in Figure 11.

Let us assume now that further speed of the engine 3 is brought about. This will cause further expansion of the centrifugal governor. At this time the lock nut 79, as reference to Figure 12 will show, has contacted with the adjacent arm 65 of the governor and therefore any further movement of the governor in the expansion thereof will cause a proportional and like upward movement of the stud bolt 78. When this movement has been sufficient to raise the end wall 102 of the first step B out of engagement with the enlarged head 70, the pressure which is at this time exerted by the contracted spring 69 will cause the sleeve 62 to move with an extraneous and forceful movement into contact with the end wall 103 of the step C on the locking member 75. The head 70 is now in engagement with the steps C and the motor vehicle is in second gear, since the instantaneous movement of the sleeve 63 is accompanied by a like movement of the cam 41 to occasion the disengagement of the enlarged portion 46 having the drum 25, and the engagement of the clutch having the drum 24. The differential shaft 9 at this time may be driven through the following gear train, 5, 8, 17, 15, and the clutch associated with the drum 24. The relative position of the parts is clearly shown in Figure 1.

A dislodgment of the head 70 through slight variations in speed will be impossible, since the steps C on the locking nuts 74 are so constructed to prohibit movement of the rearward portion of the head 70 unless the governor is contracted sufficiently to cause the slide member 74ª to be pressed downwardly to the extent of the depth of one step B, C, or D on the locking member 74.

Further increase in speed of the engine will occasion a further upper movement of the stud bolt 78 and a like upward movement of the locking member 75 until the end wall 103 is clear of the head 70. Again the spring 69 is pressed to force the sleeve 63 with an instantaneous movement into engagement with the third step D of the locking members. The vehicle will now be driven with the differential shaft 9 directly connected to the engine shaft 3. This is due to the fact that the drum 23 of the clutch is associated with the gear 5 and the gear 5 is driven directly by the engine shaft 3. The counter shaft 7 at this time will merely idle as far as power to the differential is concerned, but will serve to actuate the governor mechanism.

Any decrease in the speed of the engine will cause a reverse movement of the sleeve 63. With reference to Figure 13, the full lines disclose the governor mechanism as it appears when the car is being driven in high or third speed. The dotted lines show precisely what will happen if the speed of the engine is decreased sufficient to permit the arms 65 to engage with the slide 74ª and cause a proportional downward movement of the locking member 74. The head 70 will then be forced back into the step C by virtue of the compressed condition of the spring 63 brought about by a contraction of the governor mechanism.

If the speed of the engine is further decreased, the head 70 of the sleeve 63 will be permitted to move back to the step B and finally out of engagement entirely with the locking members 74 and 75, at which time the driving mechanism of the engine shaft 3 and the differential shaft 9 will be broken, and the engine will merely idle, driving the governor at a relatively low rate of speed.

If it is desired to reverse the direction of travel of the vehicle, it is necessary of course to reverse the direction of rotation of the differential shaft 9. To this end the lever 93, which is connected to a point adjacent the driver's seat, is moved in a counterclockwise direction. The gears 18 and 91 will then assume the position shown in dotted lines in Figure 10, and as the rotation of the governor is increased, the head 70 will finally assume the position shown in Figure 12, at which time the car may be driven in a reverse direction at a speed equivalent to the first speed.

In Figure 14 I have shown a modified form of my sliding cam shaft which is intended for use with clutch mechanisms constructed as illustrated in Figures 7 and 8, but in which the pins 33 are removed. This cam shaft is provided with three sets of pivotally mounted levers 105, 106, and 107, each of which has a roller 108 rotatably mounted on the outer end thereof. Springs 109 are mounted upon the shaft 41 and are arranged for engagement with two sets of the levers, i. e., 106 and 107, so that these levers may at all times tend to move outwardly into a plane beyond the outer surface 110 of the cam member 41.

The hollow shaft 9 is provided with three openings 111, 112, and 113 arranged for registration with the levers 105 to 107 respectively, when the shaft 41 is moved longitudinally within the shaft 9, so that the levers may move outwardly from the shaft 41 through the openings 111, 112, or 113. These openings in the shaft 9 are arranged so that there is one in registration with each of the clutch members on the shaft 9. In Figure 14 I have shown a fragmentary view of the clutch 24 or second speed clutch disposed upon the shaft 9. It will be apparent from an inspection of this figure that the rollers 108 on the levers 106, when projected through the opening 112, will contact directly with the arm portions 31 on the blocks 30 of the clutch mechanism to cause the operation of the clutch.

The innermost end of the shaft 9, as shown at 114, is provided with an inwardly extending conical projection. This projection takes the place of the spring 109 in causing the levers 105 to spread outwardly from the shaft 41 and to project through the opening 11 when the shaft 41 is moved toward the portion 114. The operation of this modified cam shaft is similar in many respects to the operation of the preferred form. The illustration in Figure 14 shows the cam shaft 41 in the act of moving out of the second speed position into the high speed position. It will be noted that the levers 105 have just started to spread by contact with the portion 114 and that the levers 106 are being drawn toward the shaft 41 by movement of the shaft. The levers 107, which have already functioned, have been entirely drawn within the shafts 9 and will not be used again until the shaft 41 is moved outwardly. It will be noted that the spring 109 on the right side of the levers 107 is compressed at this time and that there is a constant tendency to project the levers 107 through the opening 113 when the levers are moved into registration with that opening as by movement of the shaft 41.

It should be understood that in order to make use of the centrifugal force of the governor provided by the engine of the motor vehicle to change the ratio of the gears from higher to lower speeds, and from lower to higher speeds, there must be an instantaneous change and that the movement should consist in a simultaneous disengagement of one of the clutch members and engagement with another of the clutch members or vice versa. The only power in starting the vehicle which the governor receives is from the motor and by disengaging one clutch in order to engage with another, the governor is momentarily disengaged from its source of power and is therefore in a neutral position without connection with the engine. If this condition were to exist for more than a momentary period, the governor could not advance so as to cause the cam shaft 41 to move into registration with another of the clutch members. However, my present improved construction provides a mechanism in which the movement of the cam shaft caused by the gradual contraction or expansion of the governor is instantaneous, i. e., it disengages one of the clutch members and engages with another instantaneously and simultaneously. Therefore the governor is never shorn from its source of power and becomes so only when the car is at a standstill.

It should also be noticed that in my improved automatic transmission device that from neutral to first speed I have eliminated the instantaneous movement. The cam shaft during this period of the operation gradually moves into engagement with the clutch associated with the low speed gear and therefore provides a gentle start of the motor vehicle. This movement of the cam shaft, however, is precisely the opposite when the cam shaft disengages from the first speed clutch. At this time, the cam shaft will move with an instantaneous movement and be freed from engagement with the first speed clutch.

I claim:

1. In a device of the type described, a hollow drive shaft, a clutch mechanism, a sliding cam disposed in said drive shaft and arranged to operate said clutch mechanism, a governor rotatably mounted on said drive shaft, a sleeve slidably mounted on said drive shaft yieldably connected at one end of said governor, a pair of cooperating locking members slidably supported at the opposite end of said governor, said locking members each being provided with a plurality of steps, and one of said locking members being relatively close to said shaft at its inner end, and the steps on the other locking member being arranged to lie away from said drive shaft at its inner end, and means associated with said locking members and with said governor, whereby said locking members may be actuated when said governor expands or contracts to permit said sleeve to become engaged with certain steps of said locking members with a quick forceful movement.

2. In a device of the type described, a drive shaft, a governor rotatably mounted on said drive shaft, a sleeve slidably mounted on said drive shaft, one end of said governor being disposed concentric said sleeve, compression springs on either side of said end of said governor and in engagement with said sleeve at their outer ends, a driven sleeve at the opposite end of said governor, said sleeve on said drive shaft being provided with an annular enlarged head portion, a pair of cooperating lock members slidably supported on said driven sleeve, and means for connecting said locking members with said governor, whereby said locking members may move with the expansion or contraction of said governor to permit the enlarged head of said sleeve to advance or retract by virtue of said compression springs with a quick forceful movement at predetermined intervals in the contraction or expansion of said governor.

3. In a device of the character described having a shaft, a transmission mechanism connected with said shaft, and a sliding cam for operating said transmission, of a governor arranged to rotate with said shaft, means actuated by said governor for causing a forceful, limited movement of said sliding cam at predetermined intervals in the increase or decrease of speed in the said shaft, said means comprising a pair of co-operating locking members, a head member connected with said sliding cam arranged for engagement with said locking members, and a compression spring disposed between said sliding cam and the free end of said governor.

HENRY R. HOFFMAN.